United States Patent Office 2,695,243
Patented Nov. 23, 1954

2,695,243

TEXTILE FINISHING COMPOSITION AND METHOD OF MAKING AND USING IT

Milton Kosmin, Dayton, Ohio, assignor to Monsanto Chemical Company, St. Louis, Mo., a corporation of Delaware No Drawing. Application March 24, 1951,
Serial No. 217,415

12 Claims. (Cl. 106—270)

This invention relates to new polyamino compounds, to the processes of producing the same and to improved textile finishing compositions containing the new compounds. The invention also relates to methods of finishing and softening cellulosic fibers and textile fabrics made therefrom.

An object of the invention is the preparation of new, valuable compositions by reaction of certain aliphatic polyamines with chlorinated wax. Another object of the invention is to produce improved softening agents for fibers and textile materials. A further object of the invention is to impart improved pliability and crease-resistance to woven fabrics.

These and other objects hereinafter disclosed are provided by the following invention wherein there are prepared compositions comprising an amino compound selected from the class consisting of certain wax-alkylated alkylenepolyamines and salts thereof.

In the Kyrides Patent U. S. 2,267,205, issued December 23, 1941, there are disclosed water-soluble N-alkylated amines having the general formula X—NH—R—(NH—R)$_n$—NH—Y in which R is an alkylene radical of from 2 to 3 carbon atoms, $n$ is 0, 1 or 2 and X is selected from the class consisting of hydrogen and lower alkyl radicals and Y is an alkyl radical having at least 7 and not more than 18 carbon atoms. The materials were generally prepared by heating an n-alkyl halide of from 7 to 18 carbon atoms with an alkylenepolyamine. The products thus obtained were useful as surface-active agents, possessing very good detersive properties.

Now I have found that when the alkylenepolyamines are condensed with an incompletely chlorinated paraffin wax instead of the previously employed n-alkyl halide, products are obtained which differ essentially from the water-soluble, surface-active compounds of the Kyrides patent cited above. Condensation products of the alkylenepolyamines and the incompletely chlorinated wax possess little, if any, utility as surface-active agents. They are stable, liquid to waxy solids which are water-insoluble, but which are readily emulsified in water to form stable emulsions having very good textile-softening properties.

The present condensation products are prepared by heating an alkylenepolyamine with an incompletely chlorinated wax. The reaction may be carried out by mixing the alkyleneamine with the partially chlorinated wax and heating to a temperature of from, say, 100° C. to 200° C., until substantially one mole of the amine has condensed with one mole of the chlorinated wax.

The alkylenepolyamines which are suitable for alkylation to obtain useful agents according to the invention are those containing at least two but less than 5 nitrogen atoms in the molecule, each alkylene radical of which has from 1 to 3 carbon atoms. They may be obtained by the reaction of ammonia with dihalogenated ethane or propane having the halogens on different carbon atoms, that is, not more than one halogen on any single carbon atom. Such alkylenepolyamines include ethylenediamine and propylenediamine, diethylenetriamine, triethylenetetramines, dipropylenetriamines, and the like. Only those alkylene polyamines having more than one amino group attached to any single carbon atom are preferred. Such polyamines may also be obtained by other known methods of synthesis. The formulae of suitable polyamines which may be alkylated to obtain desirable agents for use according to the inventions are exemplified by:

Ethylenediamine, $NH_2$—$CH_2CH_2$—$NH_2$
Trimethylenediamine, $NH_2$—$CH_2CH_2CH_2$—$NH_2$
Propylenediamine, $NH_2$—$CH_2$—$CH(NH_2)$—$CH_3$ Dipropylenetriamines,

$NH_2$–$CH_2CH_2CH_2$–$NH$–$CH_2CH_2CH_2$–$NH_2$
$CH_3$–$CH(-NH_2)$–$CH_2$–$NH$–$CH_2$–$CH(NH_2)$–$CH_3$
$CH_3$–$CH(NH_2)$–$CH_2$–$NH$–$CH_2CH_2CH_2$–$NH_2$

Diethylenetriamine, $NH_2$–$CH_2CH_2$–$NH$–$CH_2CH_2$–$NH_2$

Since the nomenclature of the alkylenepolyamines having more than two nitrogen atoms is rather complex, I have as with the dipropylenetriamines in the above list, grouped together all the various isomeric compounds as dipropylenetriamines, tripropylenetetramines, etc. and refer to them throughout this specification in that manner.

The incompletely chlorinated wax used for the preparation of the present products is obtained by passing chlorine into a paraffin wax having from, say 20 to 30 carbon atoms, at a temperature sufficient to maintain the wax in a molten state, until the wax contains an amount of organically combined chlorine not greater than that theoretically required for 75 per cent to 150 per cent monochlorination of all the hydrocarbons in the paraffin wax, as evidenced by gain in weight of the reaction mixture. The resulting product consists predominantly of a mono-chloro-wax although some unchlorinated wax and some di- and poly-chloro waxes are present.

Heating of such an incompletely chlorinated wax with the alkylenepolyamine at temperatures of from, say, 100° C. to 200° C. until the condensation reaction is substantially completed, as evidenced by lack of hydrogen chloride evolution, yields a condensation product consisting of wax (that which was unattacked in the chlorinating reaction), and the wax-alkylated alkylenepolyamine. If an excess of the alkylenepolyamine has been initially employed, the unreacted amine is also a constituent of the condensation product. This unreacted amine may be readily removed from the condensation product by distillation to yield as a residue a mixture of paraffin wax and the wax-substituted alkylenepolyamine.

The mixture of paraffin wax and the wax-alkylated amine is very advantageously employed as a softening agent for cellulosic fibers and textile fabrics made therefrom, as will be hereinafter described. While the mixture is very water-insoluble it forms extremely stable emulsions with water, and aqueous emulsions containing up to, say, 2 per cent by weight of the wax-alkylated amine mixture, are particularly valuable fiber- and textile-softening compositions. Inasmuch as the presence of the unreacted wax in the condensation product contributes to the softening properties thereof, when the product is to be employed for this purpose, the wax-alkylated amine need not be isolated. When it is desired to employ the wax-alkylated alkylenepolyamine for other purposes, e. g., for plasticizing synthetic resins, water-proofing fibrous products, etc., the unreacted wax may be removed, e. g., by vacuum distillation or solvent extraction, to isolate the alkylated amine.

With some fibers and textiles it is desirable to employ a substantially neutral softening agent. This may be obtained by treating the mixture of wax and wax-alkylated alkylene polyamine with an acid to the neutral point. The resulting mixture of unreacted wax and salts yields aqueous emulsions which are particularly valuable as neutral softening agents for synthetic fibers and textiles derived from cellulosic materials, e. g., rayon, cellulose acetate, etc.

Neutral water-soluble salts are also obtained by acidifying the isolated N-alkylated alkylenepolyamines to the neutral point. The isolated salts thus obtained may be used for a variety of purposes, e. g., as biological toxicants, chemical intermediates, etc.

Acids which may be employed for neutralizing the mixture of wax and wax-alkylated amine, or the isolated wax-alkylated amine, are inorganic or organic acids generally, e. g., hydrochloric, sulfuric, phosphoric, acetic, oxalic, benzoic, benzenesulfonic, or furoic acid, etc.

The invention is further illustrated but not limited by the following examples.

Example 1

Chlorine was introduced into 400 g. of a semi-refined paraffin wax (Pure Oil Company) at a temperature of 80° C. until the weight of the reaction mixture was 442.4 g. The weight gain thus obtained was 42.4 g., which is equivalent to one mole of chlorine per mole of wax employed. The chlorinated material was then washed well with hot water and dried over sodium carbonate.

The washed and dried chlorinated wax thus obtained was condensed with triethylene tetramine as follows: 221.2 g. (0.59 mole) of the chlorinated wax was heated, while stirring, with 185.0 g. (1.27 moles) of the amine at a temperature of from 175° C. to 185° C. for 4 hours. 10 g. of ethylene glycol was then added to the reaction mixture in order to promote reaction and stirring was continued at a temperature of from 185° C. to 190° C. for an additional 15 hours. At the end of that time the reaction mixture was allowed to stratify and the upper layer (275.8 g.) was decanted. 13.0 g. of unreacted amine were recovered by distilling the upper layer to a temperature of 135° C./2 mm. The residue of the upper layer consisted of unchlorinated wax and wax-alkylated triethylenetetramine.

Example 2

A mixture consisting of 197.7 g. (0.528 mole) of the chlorinated wax of Example 1 and 115 g. (1.12 moles) of diethylenetriamine was stirred at a temperature of 185° C. for 2 hours and then at a temperature of 195° C. to 200° C. for 4 hours. After allowing the resulting reaction mixture to stratify, the upper layer was decanted and distilled up to a temperature of 115° C./15 mm. to remove 21.0 g. unreacted amine. There was thus obtained as residue from the distillation, 208.0 g. of a mixture of wax and wax-alkylated diethylenetriamine.

Instead of the diethylenetriamine of this example or the triethylenetetramine of Example 1, other alkylenepolyamines, e. g., dipropylenetriamine or trimethylenediamine, may be similarly reacted with incompletely chlorinated wax to yield a mixture of wax and wax-alkylated alkylene polyamine products.

Example 3

Aqueous emulsions containing 1%, 0.5% and 0.25% by weight, respectively, of the mixture of wax and chlorinated wax-amine condensate of Example 2 were prepared by adding the condensate to water in the desired proportion and shaking the resulting mixtures. Each emulsion was tested as a textile softening composition employing the following procedure.

A 20" x 6.5" strip of desized, permanent finish Indian Head fabric was passed twice, reversing ends of fabric on second passage, through 100 ml. of the emulsion contained in a padding machine. The temperature of the treating emulsion was held at about 100° C. The treated cloth was then dried by heating it for 10 minutes in a draft oven. For purposes of comparison "blanks" were also prepared. These comprised similarly dimensioned strips of test fabric which were passed through water, in the absence of the wax chloride-amine condensate, but employing the other test conditions.

The softening effect imparted to the treated cloth was evaluated by measuring the pliability of the treated sample and of the "blank" after conditioning both samples for at least 24 hours in a constant temperature room. The pliability measurements were made on the Planoflex, an instrument designed for this purpose and described in Research Paper RP 1434 of the U. S. National Bureau of Standards (which paper is also found in the Journal of the National Bureau of Standards, 27, 469–477 (1941). Briefly, the Planoflex measures the extent to which a fabric can be distorted in its own plane without producing wrinkles on its surface. The sum of the right and left angles of distortion at which longitudinal wrinkles first appear on the surface of the specimen is taken as the "Planoflex reading." The greater the magnitude of the reading, the more pliable or flexible is the test specimen.

Employing the testing procedure described above, the following values were obtained with emulsions having the indicated concentrations of the mixture of wax and chlorinated wax-diethylenetriamine condensate of Example 2:

| Percent Concentration of Condensate in Emulsion | Planoflex Readings for "Blank" | For Treated Specimen |
| --- | --- | --- |
| 1.00 | 18.5 | 30 |
| 0.50 | 18.5 | 31 |
| 0.25 | 18.5 | 31 |

Treatment of the cloth with the present condensates is thus seen to effect a very decided increase in the pliability of the test specimens. Similar use of other of the present wax-alkylated alkylenepolyamines, e. g., the condensate of Example 1, likewise imparts increased pliability to woven fabrics.

The present compounds are advantageously employed for softening cellulosic fibers and textiles in general. Thus cotton or cellulosic synthetic fibers or fabrics manufactured therefrom, e. g., rayon, cellulose acetate, etc., may be rendered soft and smooth to the touch by treating them with aqueous emulsions or organic solutions of the wax-substituted alkylenepolyamines. The treating compositions and the treating conditions may be widely varied, as will be recognized by those skilled in the art, the salient feature of the present fiber and textile finishing compositions and methods of imparting pliability to fibers and textiles being the use of the present mixtures of wax and wax-alkylated alkylenepolyamines in the treating compositions.

What I claim is:

1. The process of preparing a textile-softening composition consisting essentially of paraffin wax and a N-paraffin wax-alkylated alkylenepolyamine having from 2 to 4 nitrogen atoms in the molecule and from 2 to 3 carbon atoms in the alkylene radical which comprises heating, at 100–200° C. until evolution of hydrogen chloride has ceased, a mixture comprising an alkylenepolyamine having from 2 to 4 nitrogen atoms in the molecule and from 2 to 3 carbon atoms in the alkylene radical and an incompletely chlorinated mixture of hydrocarbons obtained by passing chlorine into a paraffin wax until said wax contains an amount of organically combined chlorine not greater than that theoretically required for 75% to 150% monochlorination of all of the hydrocarbons in said wax and separating any unreacted portion of said alkylenepolyamine.

2. The process of preparing a textile-softening composition consisting essentially of paraffin wax and a salt of a N-paraffin wax-alkylated alkylenepolyamine having from 2 to 4 nitrogen atoms in the molecule and from 2 to 3 carbon atoms in the alkylene radical which comprises heating, at 100–200° C. until evolution of hydrogen chloride has ceased, a mixture comprising an alkylenepolyamine having from 2 to 4 nitrogen atoms in the molecule and from 2 to 3 carbon atoms in the alkylene radical and an incompletely chlorinated mixture of hydrocarbons obtained by passing chlorine into a paraffin wax until said wax contains an amount of organically combined chlorine not greater than that theoretically required for 75% to 150% mono-chlorination of all of the hydrocarbons in said wax, separating any unreacted portion of said alkylenepolyamine to obtain a residue consisting of paraffin wax and a N-paraffin wax-alkylated alkylenepolyamine having from 2 to 4 nitrogen atoms in the molecule and from 2 to 3 carbon atoms in the alkylene radical, and neutralizing said residue.

3. The process of preparing a textile-softening composition consisting essentially of a mixture of paraffin wax and N-paraffin wax-alkylated diethylenetriamine which comprises heating, at 100–200° C. until evolution of hydrogen chloride has ceased, a mixture comprising diethylenetriamine and an incompletely chlorinated mixture of hydrocarbons obtained by passing chlorine into a paraffin wax until said wax contains an amount of organically combined chlorine not greater than that theoretically required for 75% to 150% mono-chlorination of all of the hydrocarbons in said wax, and removing any unreacted diethylenetriamine.

4. The process of preparing a textile-softening composition consisting essentially of a mixture of paraffin wax and N-paraffin wax-alkylated triethylenetetramine which comprises heating at 100–200° C. a mixture comprising triethylenetetramine and an incompletely chlorinated mixture of hydrocarbons obtained by passing chlorine into a paraffin wax until said wax contains an amount of organically combined chlorine not greater than that theoretically required for 75% to 150% mono-chlorination of all of the hydrocarbons in said wax, and removing any unreacted triethylenetetramine.

5. A textile softening composition produced by the method defined in claim 1.

6. A textile softening composition produced by the method defined in claim 2.

7. A textile softening composition produced by the method defined in claim 3.

8. A textile softening composition produced by the method defined in claim 4.

9. The process of softening cellulosic fibers and textile fabrics made therefrom which comprises treating said fibers and textiles with a textile softening composition prepared by the method defined in claim 1.

10. The process of softening cellulosic fibers and textile fabrics made therefrom which comprises treating said fibers and textiles with a textile softening composition prepared by the method defined in claim 2.

11. The process of softening cellulosic fibers and textile fabrics made therefrom which comprises treating said fibers and textiles with a textile softening composition prepared by the method defined in claim 3.

12. The process of softening cellulosic fibers and textile fabrics made therefrom which comprises treating said fibers and textiles with a textile softening composition prepared by the method defined in claim 4.

References Cited in the file of this patent

UNITED STATES PATENTS

| Number | Name | Date |
|---|---|---|
| 2,201,041 | Katz | May 14, 1940 |
| 2,214,352 | Schoeller | Sept. 10, 1940 |
| 2,267,205 | Kyrides | Dec. 23, 1941 |

OTHER REFERENCES

"Chlorowax"—Diamond Alkali Co., Pittsburgh, Pa., page 18.

"Commercial Waxes," Bennett, Chemical Pub. Co., Brooklyn, N. Y., page 566.